(12) United States Patent
Bertosa et al.

(10) Patent No.: US 7,987,028 B2
(45) Date of Patent: Jul. 26, 2011

(54) METHOD AND APPARATUS FOR READING AND ERASING DIAGNOSTIC TROUBLE CODES FROM A VEHICLE

(75) Inventors: Thomas Bertosa, Chardon, OH (US); Michael Gessner, Akron, OH (US); Hamid Namaky, South Russell, OH (US)

(73) Assignee: SPX Corporation, Charlotte, NC (US)

( * ) Notice: Subject to any disclaimer, the term of this patent is extended or adjusted under 35 U.S.C. 154(b) by 1327 days.

(21) Appl. No.: 11/519,048

(22) Filed: Sep. 12, 2006

(65) Prior Publication Data
US 2008/0065289 A1 Mar. 13, 2008

(51) Int. Cl.
*G01M 17/00* (2006.01)
(52) U.S. Cl. .......................................... 701/29
(58) Field of Classification Search ............... 701/29; 340/438
See application file for complete search history.

(56) References Cited

U.S. PATENT DOCUMENTS

| | | | |
|---|---|---|---|
| 6,347,267 B1 * | 2/2002 | Murakami | 701/35 |
| 7,073,714 B2 | 7/2006 | Namaky et al. | |
| 2004/0230356 A1 * | 11/2004 | Namaky | 701/29 |
| 2005/0021294 A1 * | 1/2005 | Trsar et al. | 702/183 |
| 2005/0119809 A1 * | 6/2005 | Chen | 701/33 |
| 2007/0293999 A1 * | 12/2007 | Underdal et al. | 701/29 |
| 2007/0294001 A1 * | 12/2007 | Underdal et al. | 701/29 |

* cited by examiner

*Primary Examiner* — John Q Nguyen
*Assistant Examiner* — Rodney King
(74) *Attorney, Agent, or Firm* — Baker & Hostetler LLP

(57) ABSTRACT

A method and apparatus is provided that allows a technician to retrieve diagnostic trouble codes (DTCs) and remove any duplicates. The diagnostic tool can retrieve DTCs from the various diagnostic systems in the vehicle, remove any duplicates and display a unique list of DTCs. The diagnostic tool can also erase all DTCs including any duplicates from the vehicle after repairs have been completed. The tool can retrieve the DTCs without the user selecting the system to retrieve from.

14 Claims, 3 Drawing Sheets

METHOD AND APPARATUS FOR READING AND ERASING DIAGNOSTIC TROUBLE CODES FROM A VEHICLE

FIELD OF THE INVENTION

The present invention relates generally to an automotive scan tool. More particularly, the present invention relates to an automotive scan tool that is capable of removing duplicate diagnostic trouble codes (DTCs) and then erasing all DTCs from the vehicle.

BACKGROUND OF THE INVENTION

Modern vehicles typically have one or more diagnostic systems, generally having separate computer control modules to control various functions of the vehicle. Some examples include power train control module (PCM), engine control module (ECM), a transmission control module (TCM), Anti-locking brake system (ABS), and an air bag control module. The vehicle diagnostic systems often have self-diagnostic capability to detect and alert the driver of problems the vehicle may be encountering. When a problem is found, a diagnostic trouble code or DTC, is set within the computer's memory. DTCs are as general or as specific as the manufacturer desires. Different vehicle models may have different sets of DTCs, including DTCs that report the same problem via different DTCs.

Further complicating matters, the E.P.A. (Environmental Protection Agency) has instituted the Onboard Diagnostics II (OBD II) system to diagnose and alert a driver to problems with a vehicle's emissions system. The OBD II system is required for all 1996 and newer vehicles. This system monitors the vehicle's emissions and if it detects any problems, the OBD II system will turn on the "Check Engine" light or the "Malfunction Indicator Lamp" (MIL), located on the instrument panel of the vehicle. Traditionally, the MIL or the Check Engine light is lit when a problem causes emissions from the vehicle to exceed the federal guidelines. Further, the OBD II system generates its own set of DTCs to assist a technician in detecting the specific problem that gave rise to the illumination of the MIL.

To retrieve and decipher DTCs, an auto repair technician needs a diagnostic tool. The diagnostic tool must, therefore, be connected to the vehicle's computer bus system to access and retrieve the DTCs. Scan tools are testing devices that interface with vehicle diagnostic systems to retrieve information from the various control modules. The scan tools are equipped to communicate in various communication protocols such as controlled area network (CAN), J1850 VPM and PWM, ISO 9141, Keyword 2000 and others. These communications protocols are specific to the various automobile manufacturers. The scan tool will help the technician to diagnose and repair the vehicle.

A low-cost alternative to the scan tool is a "code reader." In 1998 Actron Manufacturing Corp. (a subsidiary of SPX Corporation) pioneered the first OBD II (On-Board Diagnostic) code reader. Similar to a scan tool, a code reader is a relatively basic device that links with one or more computer modules in a vehicle diagnostic system via the electronic control unit (ECU) of a vehicle computer network and reads any diagnostic trouble codes that are set by the vehicle's diagnostic system, and displays any DTCs on a display. Code readers are marketed to automobile hobbyists, professionals and non-professionals.

Further, there are some sensors or equipment in the vehicle that may be common to several systems in the vehicle. Thus, when there is a problem with one of those sensors, the numerous systems that share it may generate their own various DTCs to indicate that there is a problem. However, the various DTCs all note the sane issue, which is redundant and leads to "duplicate DTCs."

Therefore, the technician will not know at the outset that duplicate DTCs have been saved by the vehicle's computer. Although, the codes may look unique alphanumerically, they may point to the same problem. The only way to know for sure is to research each DTC and find its origin. Accordingly, the technician will have to perform additional research to decipher the list of DTCs. When duplicate DTCs are discovered, the technician may get frustrated with wasting his or her time and this will increase the cost to the consumer to repair the vehicle.

In addition, once the origin of the DTC is determined and the problem has been resolved, the technician has to delete the DTC from the computer's memory. When there are duplicate DTCs to clear, the technician, once again spends additional time clearing the duplicates.

Accordingly, it is desirable to provide an apparatus and method that can alert a technician that duplicate DTCs have been detected and removed so that diagnosis of the vehicle can be more accurate and less time consuming. It is also desirable to remove all the DTCs including any duplicates when the repairs are completed.

SUMMARY OF THE INVENTION

The foregoing needs are met, to a great extent, by the present invention, wherein in one aspect a tool is provided that in some embodiments the tool retrieves DTCs from various computer systems in a vehicle, and remove any duplicate DTCs before displaying to the user. The tool can also delete all DTCs from the vehicle.

In accordance with one embodiment, a diagnostic tool for communicating with a vehicle is provided and includes a processor operably coupled to a memory, an input device operably coupled to the processor for inputting information, a communication device operably coupled to the processor, and a housing surrounding the processor, the memory, the input device and the communication device, wherein the communication device can be configured to communicate with vehicle onboard computer systems and the processor can be configured to retrieve diagnostic trouble codes from multiple systems using multiple communication protocols from the vehicle and remove duplicate diagnostic trouble codes before displaying to a user.

In accordance with another embodiment, a diagnostic tool for communicating with a vehicle is provided and includes a processor operably coupled to a memory, an input device operably coupled to the processor for inputting information, a communication device operably coupled to the processor, and a housing surrounding the processor, the memory, the input device and the communication device, wherein the communication device can be configured to communicate with vehicle onboard computer systems and the processor can be configured to retrieve diagnostic trouble codes from multiple systems using multiple communication protocols and clear diagnostic trouble codes from multiple systems of the vehicle using multiple communication protocols.

In accordance with yet another embodiment, a method of producing a unique list of diagnostic trouble codes from vehicle that includes communicating with vehicle onboard computer systems using a diagnostic tool, retrieving diagnostic trouble codes stored in multiple vehicle onboard computer systems using multiple communication protocols, determining whether duplicate diagnostic trouble codes exist, removing any duplicate diagnostic trouble codes, and displaying a unique list of diagnostic trouble codes, wherein the communicating, retrieving, determining, removing and displaying are done in response to a single operation of pressing a button or a menu selection is selected.

In accordance with another embodiment, a method of erasing duplicate diagnostic trouble codes from a vehicle can include communicating with vehicle onboard computer systems using a diagnostic tool, retrieving diagnostic trouble codes stored in multiple vehicle onboard computer systems using multiple communication protocols, determining whether duplicate diagnostic trouble codes exists, and clearing diagnostic trouble codes including any duplicate diagnostic trouble codes in multiple vehicle onboard computer systems using multiple communication protocols, wherein the communicating, retrieving, determining and clearing are done in response to a single operation of pressing a button or a menu selection is selected.

In accordance with another embodiment, a diagnostic tool system for communicating with a vehicle is provided and can include a means for processing operably coupled to a memory means, a means for inputting operably coupled to the means for processing for inputting information, a means for communicating operably coupled to the means for processing, and a means for housing surrounding the means for processing, the memory means, the means for inputting and the means for communicating, wherein the means for communicating can be configured to communicate with vehicle onboard computer systems and the means for processing can be configured to retrieve diagnostic trouble codes from multiple systems using multiple communication protocols from the vehicle and remove duplicate diagnostic trouble codes before displaying to a user.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
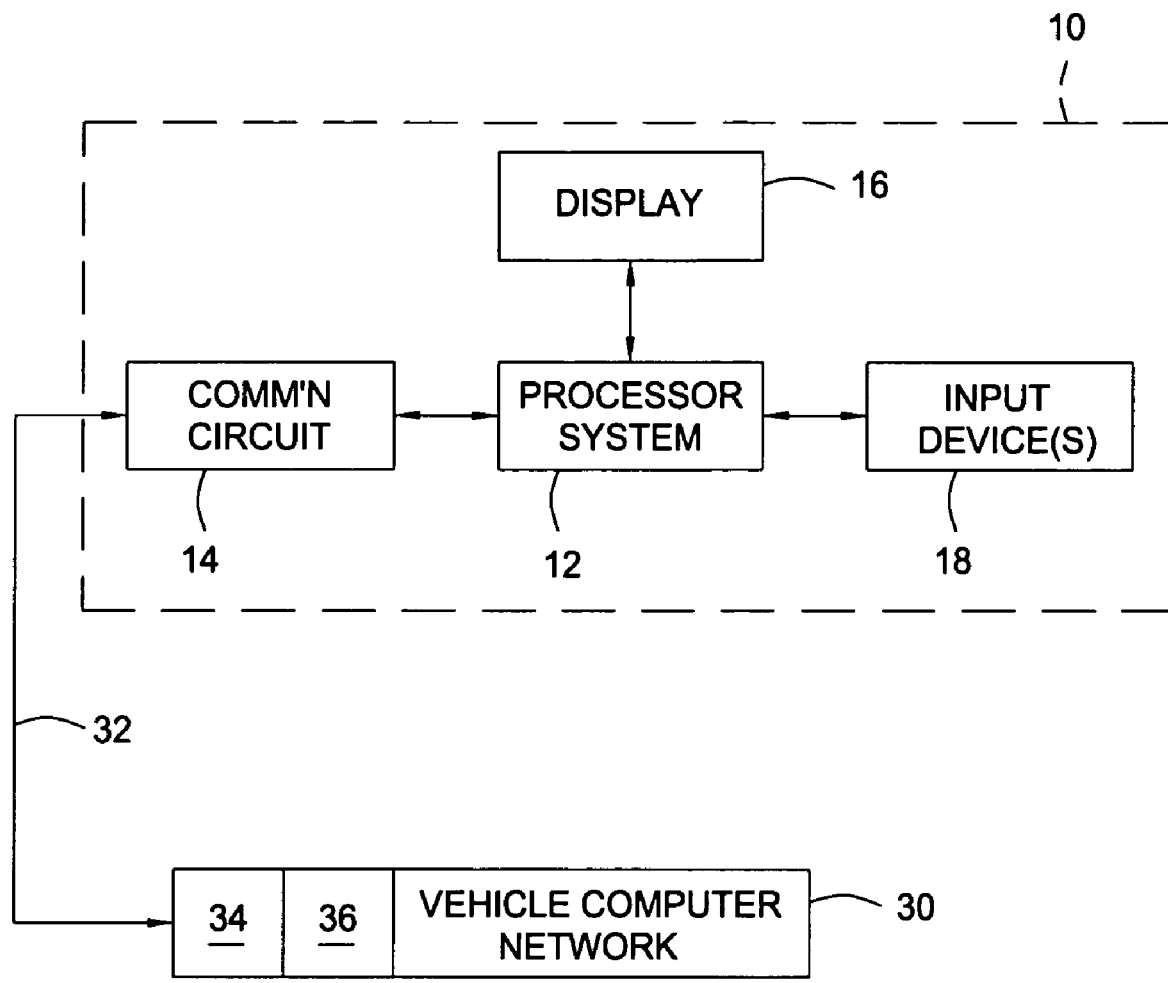
FIG. 1 illustrates a block diagram of a diagnostic tool of the present invention.

The invention will now be described with reference to the drawing figures, in which like reference numerals refer to like parts throughout. An embodiment in accordance with the invention provides a diagnostic tool that can distinguish between various diagnostic trouble codes (DTCs) that are generated by a vehicle. Specifically, in one embodiment of the present invention, the diagnostic tool will present the technician with an easy-to-use unique list of codes.

Traditionally, when a technician used a diagnostic tool to communicate with a vehicle, he had to select the appropriate communication protocol for that vehicle. Then the technician had to select the systems he wanted to check. This can be a hit or miss prospect as the technician may not know which systems require attention. This may result in the technician failing to check some systems altogether, leaving some DTCs in the systems and failing to repair the problems indicated by those DTCs.

In an embodiment of the invention, the diagnostic tool can be instructed to check the entire vehicle's diagnostic systems for all DTCs that are present. The technician will still have the option of selecting particular systems as the technician desires. In this manner, the technician has added flexibility not found in diagnostic tools while ensuring that all DTCs present in the systems are acknowledged and all the problems in the vehicle are checked and appropriately repaired.

FIG. 1 illustrates a block diagram of a diagnostic tool 10 of the present invention. The diagnostic tool can be any computing device, such as a scan tool, code reader, a personal computer, a personal digital assistant, a cellular phone, or a notebook. The tool 10 includes a processor system 12 in communication with a communication circuit 14, a display 16, and one or more input devices 18.

The processor system or processor 12, may be one of virtually any number of processor systems and/or stand-alone processors, such as microprocessors, microcontrollers, field programmable gate array (FPGA), and digital signal processors. The processor 12 has associated either internally or externally and in communication with volatile and non-volatile memories (such as RAM, ROM, EPROM, EEPROM), clocks, decoders, memory controllers, and/or interrupt controllers, etc. (all not shown) known to those in the art to be needed to implement a processor circuit.

The communications circuit 14 typically generates one or more communications protocols with which the tool 10 and a vehicle computer network 30 communicate with one-another. The communications circuit 14 can be implemented via hardware and/or software. Communication circuit 14 includes the appropriate transmitters and receivers to generate a communications link consistent with any one or more of the following protocols: SAE J1850 (VPM), SAE J1850 (PWM), ISO 9141-2, ISO 14230-4 ("Keyword 2000"), and Controller Area Network ("CAN") (ISO 15765-4). The examples given are not intended to be limited to any specific protocol, or even to electrical communications protocols. Other present and future protocols, such as fiber optic and wireless communications protocols are also contemplated as being within the scope of the present invention.

The display 16 has at least a display circuit for communicating with the processor. The display circuit having a display region for displaying one or more display characters. The display region can be one or more of virtually any type of display, e.g., textual displays (such as n character by m line LCD or plasma displays, etc.), binary displays (such as LEDs, lamps, etc.), graphical displays (such as LCD displays that can display text and bar graphs and the like), etc. The tool can display the alphanumeric diagnostic codes and also the textual diagnosis descriptions corresponding to the diagnostic codes.

The input device(s) 18 are typically one or more buttons, keys or a keyboard, but may be one or more of virtually any type of input device, such as touch screens, etc. In addition, one or more optional additional storage devices (not shown) can be placed in communication with the processor system 12 and can comprise, for example, cartridge memories (such as those containing EPROM, EEPROM, or Flash PROM memories), PC cards, secure digital cards, compact flash, stick memories (such as SONY brand MEMORY STICK packaged memory semiconductors), so-called floppy diskettes, etc.

The processor 12 typically executes a computer program stored in its RAM, ROM, Flash memory, EPROM and/or stored in any of the additional storage devices (all not shown), and uses data stored in any one or more of those memories. For example, the processor 12 may execute a computer program from an EEPROM (not shown) using data (e.g., OBD II diagnostic codes or textual descriptions of diagnostic codes) stored in a cartridge memory.

In general, the computer program executed by the processor in the tool initializes the tool and generates a user interface (e.g., using the input device(s) 18), through which a user causes the tool to communicate with the vehicle computer network 30 to read certain data (diagnostic codes) from the vehicle computer network 30, format such read data, and display the formatted data on the display 16.

The processor may also access at least one or more databases stored in memory that contain information about the various vehicles under test including the various modules and diagnostic systems and their associated DTCs. Additionally, the database or databases will also have the information regarding the various protocols utilized in said vehicles. The database or databases may be stored locally or externally including on a remote computing device. The information contained in the database may also be part of the program that operates the tool.

The code reader 10 is placed in communication with the vehicle computer network 30 having one or more interconnected computers via a connection link carried by a communication cable 32. The connection cable 32 typically has a connector 34 affixed thereto that connects to a mating connector 36 in communication with the vehicle computer network 30.

Figure 2:
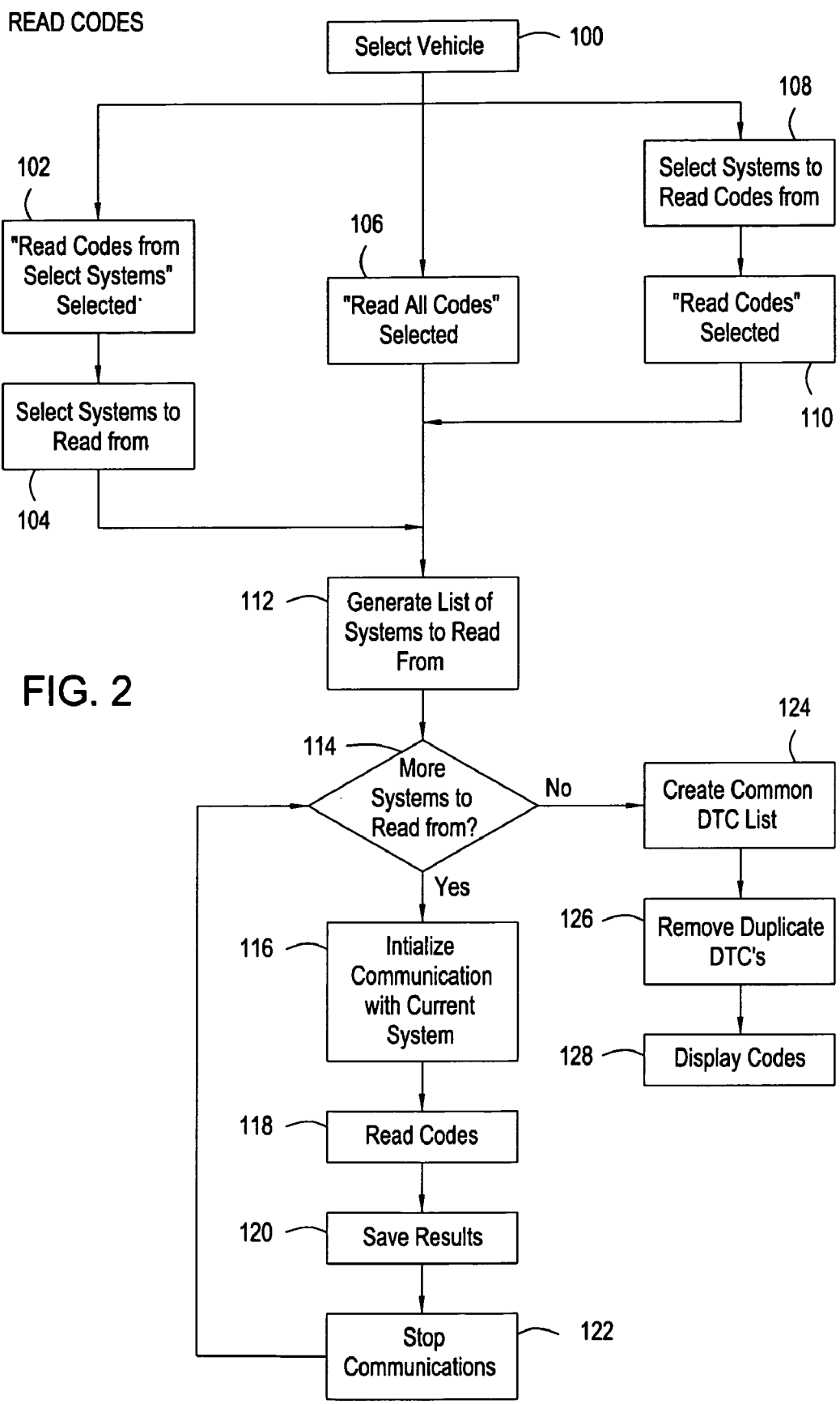
FIG. 2 is a flowchart illustrating steps in accordance with one embodiment for obtaining a unique list of DTCs.

FIG. 2 is a flowchart illustrating steps in accordance with one embodiment for obtaining a unique list of DTCs. These steps may be performed via software and/or hardware. At step 100, the technician selects the vehicle, such as make and model to retrieve the DTCs from. At step 102, the technician instructs the diagnostic tool 10 to "Read Codes from Select Systems" and then at step 104, the technician selects, from a menu, the systems he desires for the diagnostic tool 10 to retrieve the DTCs. This embodiment may be used if the technician already suspects which systems will have stored DTCs or because the driver has informed the technician that the problems he is experience is localized in those systems.

In another embodiment, the technician may instruct the diagnostic tool 10 to "Read All Codes" at step 106. In this mode, the diagnostic tool 10 will collect DTCs from all systems of the vehicle. At step 106, the tool 10 (based on the vehicle previously selected) knows what the various diagnostic systems and the appropriate communication protocols are for that vehicle and retrieves the DTCs stored in the various systems of the vehicle. The tool can access database (stored in the software itself or on other memory portions of the tool) containing information about the selected vehicle, such as communication protocols and the various diagnostic systems in the vehicle. The tool 10 can attempt to contact the vehicle with the appropriate communication protocols to collect the DTCs. In another embodiment, the tool first communicates in the appropriate communication protocols and then attempts other communication protocols in case the database contains inaccurate information about the protocols used for the selected vehicle. This way, the tool can retrieve all DTCs that have been placed in the various diagnostic systems. Additionally, step 106 allows the technician to at a press of a button or a menu selection to retrieve all DTCs and then subsequently, the tool provides him with a unique list of DTCs (without duplicate DTCs). This allows the technician to quickly and easily retrieve the DTCs that are possible in the various diagnostic systems of the vehicles without worrying if he missed a system.

In yet another embodiment, the technician may first select the desired systems at step 108 and then instruct the diagnostic tool 10 to "Read Codes" from the selected systems at step 110. Thus, there are a variety of ways in which the technician can choose the method of reading the DTCs depending on his needs.

At step 112, the diagnostic tool 10 will generate a list of the systems to Read from, based on the selection previously made by the technician. Then the tool 10 reads the DTCs from the various systems based on the selections by the technician and stores the DTCs in a memory.

Subsequently, at step 114, the diagnostic tool 10 will determine if there are additional systems that needs to be queried. This may be do to incorrect protocols being used and that the tool recognizes that particular systems have not responded. If there are additional systems to be queried, then the tool proceeds to step 116 where the diagnostic tool 10 initializes communication with the current system. At this point, the tool may try to communicate in various communication protocols to ensure that the tool is communicating with the system. The tool 10 then reads the DTCs at step 118, saves results at step 120 and then ceases communications at step 122, before returning to step 114.

Again, the tool will determine if there are still additional systems that need to be queried. If there are no additional systems, then the tool generates a common DTCs list, at step 124. Thus, this list includes all the DTCs that are present in the vehicle including any duplicates. At step 126, the diagnostic tool 10 will remove all the duplicate DTCs and display the unique list of codes at step 128. Because the database(s) or other software (including the tools software) provide information about the various systems in the vehicle and their associated DTCs, the tool can compare the DTCs generated against the database(s) or other software and filter out the duplicate DTCs. For example, if one sensor is shared by the transmission and engine modules, both modules can report different DTCs for the same problem. By displaying only non-duplicate DTCs, the technician can focus on the systems that are at issue instead of having to waste time figure out which DTCs are duplicates and which systems are the same systems that are reporting the DTCs.

Figure 3:
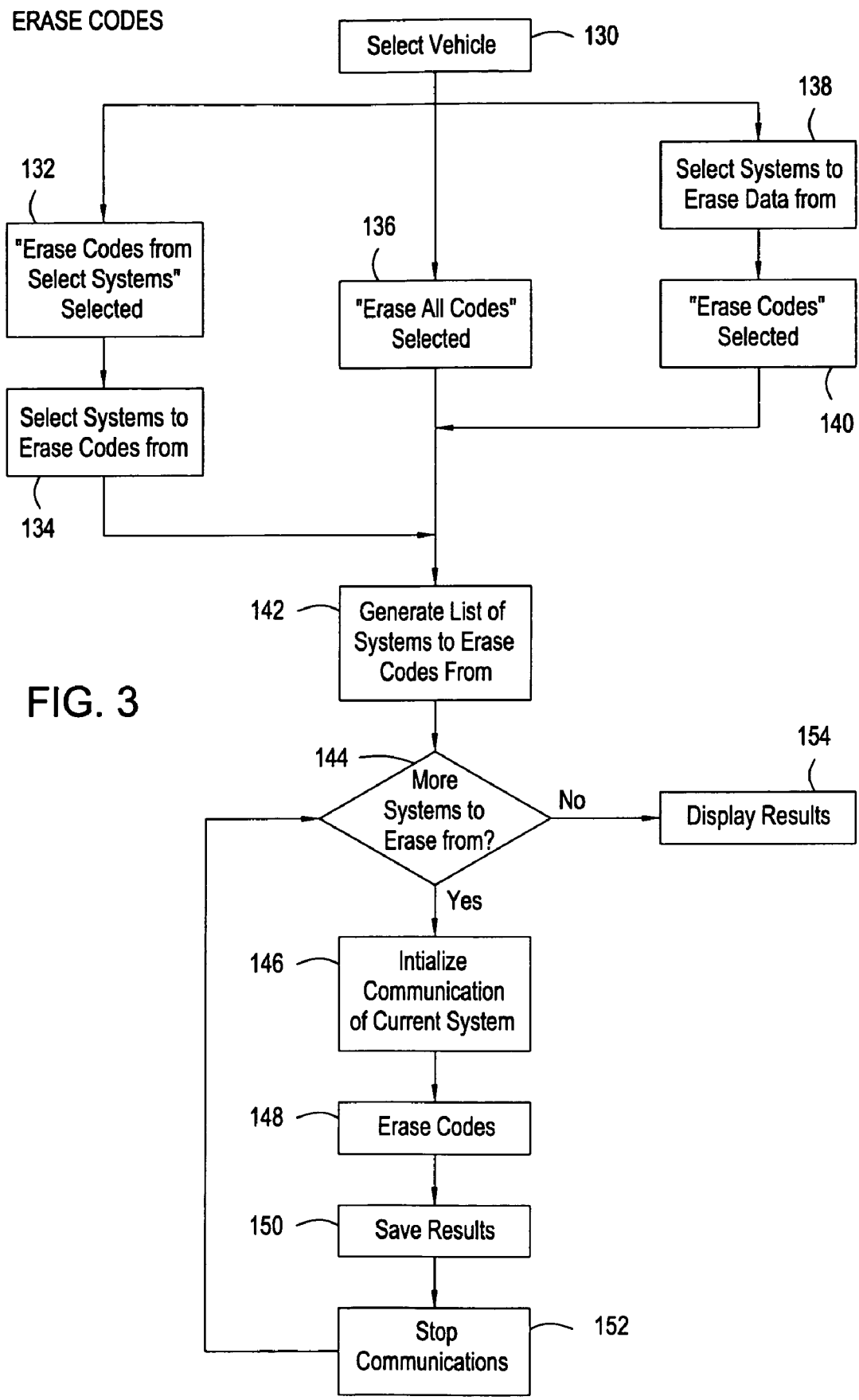
FIG. 3 is a flowchart illustrating steps for erasing DTCs in accordance with one embodiment of the invention.

FIG. 3 is a flowchart illustrating steps for erasing DTCs in accordance with another embodiment of the invention. In a similar fashion, the technician can erase DTCs from a vehicle upon completing the necessary repairs with the press of a single button or selection from the menu.

Once the technician has repaired the systems reporting the DTCs, using the unique list, the technician will need to delete or clear all the DTCs including the duplicates stored in the various systems of the vehicle. Here the diagnostic tool 10 does it automatically, finding the duplicate DTCs, and erasing them.

Therefore, at step 130, the technician selects the vehicle and can proceed in a variety of ways, as shown below. At step 132, the technician may select "Erase Codes from Select Systems" and then select the systems the technician desires at step 134.

In an alternate embodiment, the technician may select that DTCs from all the systems be reviewed for duplicates and erased, at step 136. At this step, the tool can clear the DTCs through known communication protocols based on the selection of the vehicle. In an alternative embodiment, the tool first communicates in the appropriate communication protocols and then attempts other communication protocols in case the database contains inaccurate information about the protocols used for the selected vehicle in order to clear any remaining DTCs. At step 136, with a press of a button or a menu selection, the tool can automatically determine all the DTCs present and erase them from the various diagnostic systems or modules.

In still another embodiment, the technician may initially select the systems he wishes to clear, at step 138. Then instruct the diagnostic tool 10 to "Erase Codes" from those systems selected at step 140.

Thereafter, at step 142, the diagnostic tool 10 generates a list of systems to erase codes from. Then, at step 144, the diagnostic tool 10 determines whether there are additional systems or that certain systems have not responded that would need to have their DTCs erased. If the tool determines that there are still additional systems that need their DTCs erased, the diagnostic tool 10 then initializes communication of the current systems at step 146, erases the codes at step 148, saves the results at step 150 and stops communications at step 152.

Subsequently, at step 144, the diagnostic tool again determines whether there are still additional systems that may contain DTCs that need to be cleared. If so, then the tool proceeds to step 146 as discussed above. If the tool determines that all the systems are now cleared of DTCs, the diagnostic tool 10 simply displays the results of the process at step 154 and the steps are completed.

In still another embodiment, the tool stores in memory where (modules and/or diagnostic systems) all the DTCs were reported including the duplicate DTCs. Based on this memory, the tool 10 can send an erase or clear signal to all the modules and diagnostic systems that reported DTCs and have the DTCs cleared. If the tool 10 is disconnected for repairs, upon reconnecting with the vehicle's computer, the technician can select the vehicle and then the DTCs can be cleared based on the tool remembering the DTCs that were retrieved from the selected vehicle. If the tool is connected throughout the reading and repair processes, then with a press or a button or a simple menu selection, all of the DTCs including the duplicates can be erased.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for communicating with a vehicle, comprising:
    a processor operably coupled to a memory;
    an input device operably coupled to the processor for inputting information;
    a communication device operably coupled to the processor; and
    a housing surrounding the processor, the memory, the input device and the communication device, wherein the communication device is configured to communicate with vehicle onboard computer systems, wherein the processor is configured to retrieve and to clear duplicate diagnostic trouble codes, wherein the processor is further configured to select all vehicle onboard computer systems from which to erase diagnostic trouble codes, and wherein the processor is further configured to delete all diagnostic trouble codes and any duplicates.

2. The tool of claim 1, wherein the input device is a keyboard, a button or a display screen.

3. The tool of claim 1, wherein the processor automatically retrieves and removes duplicate diagnostic trouble codes when a button is pressed or menu selection is selected.

4. The tool of claim 1 further comprising a display, wherein the display shows a unique set of diagnostic trouble codes.

5. The tool of claim 1, wherein the processor clears duplicate diagnostic trouble codes from multiple vehicle onboard computer systems.

6. The tool of claim 5, wherein the processor automatically retrieves and clears duplicate diagnostic trouble codes when a button is pressed or menu selection is selected.

7. The tool of claim 1, wherein the communication device communicates in at least one of the following SAE J1850 (VPM), SAE J1850 (PWM), ISO 9141-2, ISO 14230-4 ("Keyword 2000"), and Controller Area Network (ISO 15765-4) protocols.

8. The tool of claim 1, wherein the processor automatically retrieves and clears duplicate diagnostic trouble codes when a button is pressed or menu selection is selected.

9. A method of erasing duplicate diagnostic trouble codes from a vehicle, comprising:
    communicating with vehicle onboard computer systems using a diagnostic tool;
    retrieving diagnostic trouble codes stored in multiple vehicle onboard computer systems with the diagnostic tool;
    determining whether duplicate diagnostic trouble codes exists; clearing any duplicate diagnostic trouble codes; and selecting all vehicle onboard computer systems from which to erase codes.

10. The method of claim 9, further comprising a user selecting vehicle onboard computer systems from which to retrieve diagnostic trouble codes.

11. The method of claim 9, wherein the step of clearing diagnostic trouble codes further comprises a user selecting vehicle onboard computer systems from which to erase codes.

12. The method of claim 9, wherein the steps of communicating, retrieving, determining, and clearing are automatically done when a button is pressed or menu selection is selected.

13. The method of claim 9, further comprising selecting a vehicle from a list of vehicles.

14. A diagnostic tool system for communicating with a vehicle, comprising:
    a means for processing operably coupled to a means for storing;

a means for inputting operably coupled to the means for processing for inputting information;

a means for communicating operably coupled to the means for processing; and a means for housing surrounding the means for processing, the means for storing, the means for inputting and the means for communicating, wherein the means for communicating is configured to communicate with vehicle onboard computer systems, wherein the means for processing is configured to retrieve and to remove duplicate diagnostic trouble codes, wherein the means for processing is further configured to select all vehicle onboard computer systems from which to erase diagnostic trouble codes, and wherein the means for processing is further configured to delete all diagnostic trouble codes and any duplicates.

* * * * *